US00RE45397E

(19) United States
(12) Reissued Patent
Van Blaricom

(10) Patent Number: US RE45,397 E
(45) Date of Reissued Patent: Mar. 3, 2015

(54) OPEN-CYCLE INTERNAL COMBUSTION ENGINE

(71) Applicant: Terry Michael Van Blaricom, Sherman Oaks, CA (US)

(72) Inventor: Terry Michael Van Blaricom, Sherman Oaks, CA (US)

(21) Appl. No.: 14/282,284

(22) Filed: May 20, 2014

Related U.S. Patent Documents

Reissue of:
(64) Patent No.: 8,181,624
Issued: May 22, 2012
Appl. No.: 11/804,238
Filed: May 17, 2007

U.S. Applications:
(60) Provisional application No. 60/841,918, filed on Sep. 5, 2006.

(51) Int. Cl.

| | |
|---|---|
| ***F02B 53/04*** | (2006.01) |
| ***F02C 3/02*** | (2006.01) |
| ***F02C 1/00*** | (2006.01) |
| ***F02K 3/00*** | (2006.01) |
| ***F04C 2/00*** | (2006.01) |
| ***F04C 18/00*** | (2006.01) |
| ***F02C 7/00*** | (2006.01) |

(52) U.S. Cl.
USPC ..... 123/237; 60/268; 60/269; 60/737; 60/39.55; 60/39.45; 123/238; 418/191; 418/201.1; 418/206.5; 418/206.6; 418/206.7

(58) Field of Classification Search
USPC ..... 60/737, 748, 752, 39.6, 39.62, 39.63, 60/39.64, 39.45, 797, 746, 268, 269, 519, 60/39.55, 39.38; 123/232, 246, 249, 204, 123/237–238; 418/191, 196, 206.5, 206.6, 418/206.7, 206.8, 201.3, 104
See application file for complete search history.

(56) References Cited

U.S. PATENT DOCUMENTS

| | | | | | |
|---|---|---|---|---|---|
| 787,521 | A | * | 4/1905 | Magney | 418/206.5 |
| 804,657 | A | * | 11/1905 | Handoll | 418/206.5 |
| 1,059,163 | A | * | 4/1913 | Jendrusik | 418/206.5 |
| 1,407,496 | A | * | 2/1922 | Storey | 418/206.6 |
| 1,645,967 | A | * | 10/1927 | Patterson | 418/206.7 |
| 2,852,914 | A | * | 9/1958 | Dooley et al. | 60/797 |
| 3,191,540 | A | * | 6/1965 | Skretting | 418/206.5 |
| 3,310,043 | A | * | 3/1967 | Gamage | 60/39.45 |
| 3,386,245 | A | * | 6/1968 | Gamage | 60/39.45 |
| 3,472,445 | A | * | 10/1969 | Brown | 418/191 |
| 3,531,227 | A | * | 9/1970 | Weatherston | 418/94 |
| 3,782,340 | A | * | 1/1974 | Nam | 123/204 |
| 3,844,117 | A | * | 10/1974 | Ryan | 123/237 |
| 3,886,734 | A | * | 6/1975 | Johnson | 60/39.63 |
| 3,890,088 | A | * | 6/1975 | Ferri | 60/737 |
| 4,009,573 | A | * | 3/1977 | Satz | 60/519 |
| 4,145,168 | A | * | 3/1979 | Smith et al. | 418/191 |
| 4,781,553 | A | * | 11/1988 | Nomura et al. | 418/201.1 |
| 4,971,002 | A | * | 11/1990 | Le | 123/238 |
| 5,069,029 | A | * | 12/1991 | Kuroda et al. | 60/737 |
| 5,154,149 | A | * | 10/1992 | Turner | 123/249 |
| 6,000,214 | A | * | 12/1999 | Scragg | 60/39.38 |

(Continued)

FOREIGN PATENT DOCUMENTS

| | | | |
|---|---|---|---|
| DE | 4008811 | A1 * | 9/1991 |
| WO | WO 8000170 | A1 * | 2/1980 |

*Primary Examiner* — Patricia Engle
(74) *Attorney, Agent, or Firm* — Colin P. Abrahams

(57) ABSTRACT

A Brayton cycle internal combustion engine of the open, or constant pressure type, in which rotary power is produced by the pressure of hot gasses against confined, rotor protrusions.

2 Claims, 2 Drawing Sheets

(56) References Cited

U.S. PATENT DOCUMENTS 6,241,498 B1 * 6/2001 Hansen et al. ..... 418/206.5
6,289,666 B1 * 9/2001 Ginter ..... 60/39.55
6,725,644 B2 * 4/2004 Vanmoor ..... 123/204
6,945,217 B2 * 9/2005 Makler ..... 123/246
7,150,611 B2 * 12/2006 Perna ..... 418/201.1
2011/0296843 A1 * 12/2011 Lawson, Jr. ..... 60/778

* cited by examiner

OPEN-CYCLE INTERNAL COMBUSTION ENGINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is based on provisional application U.S. Ser. No. 60/841,918, filing date Sep. 5, 2006.

FIELD OF THE INVENTION

This invention is an improved internal combustion engine of the Brayton, or open cycle type. An open cycle engine may be defined as an internal combustion engine in which the compression of air and the burning of fuel when mixed with the compressed air, takes place continuously. The fuel is burned in an isobaric, or constant pressure process, since the chamber is open to flow in and out.

Jet turbine engines that produce shaft power may best represent open cycle engines of the prior art. Engines of this type are called turbo-shaft engines, and are typically used to power helicopters and larger fixed-wing aircraft because they are efficient, lightweight, clean-burning, have a multi-fuel capability, and spin smoothly with no reciprocating parts.

BACKGROUND OF THE INVENTION

The aforementioned attributes notwithstanding, the turbo-shaft engine is not generally utilized to provide power in common conveyances such as boats, motorcars and, trucks. This is largely because a turbo-shaft engine is expensive to build, as much as ten times as expensive as reciprocating Otto and Diesel cycle engines of the same horsepower. This expense can be attributed largely to the exotic metals and other materials that are needed to handle the extreme temperatures present in the turbo-shaft engine. Additionally, the turbo-shaft engine cannot change its speed of rotation very quickly, which is needed in the majority of conveyances in use today. This is because the rotating components are driven at very high speeds causing a high rotational inertia that resists a change in speed. This high rotational inertia also causes a danger when failure of a rotating component occurs, because a tremendous amount of energy is stored in the high speed rotating parts. The resultant spray of hot metal parts can be very difficult to contain, piercing anything in their path.

A modern turbo-shaft engine is certainly smoother and lighter than today's dated reciprocating engines, and with the use of a regenerator, can be fairly efficient for fixed speed applications such as an aircraft propeller or an electrical power generator. Again, the acquisition and processing costs of the exotic materials needed in the turbine section push the cost of the turbo-shaft engine well out of reach for most applications. The use of a regenerator adds even more bulk and cost to the system.

In a turbo-shaft engine, the hot gasses of combustion are required to enter the turbine power section at near-sonic speeds. These near-sonic gas speeds are required to produce meaningful power. Unfortunately, the high velocity of the hot gasses causes a major energy loss due to friction and turbulence, with the parasitic friction loss increasing generally as the square of the velocity.

The aforementioned near-sonic gas speeds are required in the turbo-shaft engine because the gasses must impinge the initial rows of turbine blades at very high velocities to provide a meaningful kinetic energy force to the blades. Subsequent rows of blades produce power using a reaction force that can be compared to the lift produced by air flowing over an aircraft wing. These rows of blades also require a high velocity in the hot gasses. The power produced by the impingement and reaction forces increases greatly with an increase in the speed of the hot gasses. For this reason, turbine engines are designed to use as high a gas velocity as possible just below the velocity that would cause detrimental sonic shock waves to form. There is a substantial energy loss due to the turbulence and parasitic drag caused by these high gas speeds.

The tremendous turbulence caused by the high gas speeds, and the vectoring of hot gasses from blade to blade, also cause a substantial transfer of heat to the turbine power section components, adding to the requirement that they be fabricated from exotic, high temperature materials for adequate strength. In contrast, the present invention, an improved open cycle internal combustion engine, does not utilize a turbine power section. The present invention instead uses confined, shaped rotors that counter-rotate to produce power from the pressure of hot gasses. This rotor system does not require the ultra-high gas velocities needed to produce meaningful impingement and reaction forces, as in the turbo-shaft engine. The relatively low speed of the hot gasses in the power section of the present invention, provides a huge reduction in parasitic drag when compared to the turbo-shaft engine, resulting in a greater economy of operation. The reduced speeds and absence of blade-to-blade vectoring of the hot gasses, provides a reduction in turbulence that also reduces heat transfer from the hot gasses to the metal parts of the power section, providing a greatly reduced requirement for exotic high temperature materials.

The reduced speed of hot gasses in the present invention, when compared to a turbo-shaft engine, is made possible by the use of a unique and efficient counter-rotating rotor system to extract power. This dual rotor system provides a substantially positive containment of the hot gasses of combustion in comparison to a turbine power section, where the gasses flow relatively freely through the blades, losing useful energy in turbulence and drag when vectored from blade to blade. Rotational power in the present invention is produced mainly by the pressure of hot gasses upon the protrusions of confined rotors, rather than by the kinetic and reactive forces utilized in a turbine. This eliminates the need for ultra-high gas velocities with the resultant high amounts of energy loss and heat transfer.

In the present invention, hot pressurized gasses of combustion may be produced by any of a multitude of different fuels, to apply a pressure force to the surfaces of protrusions on counter-rotating rotors that rotate within a closely confining encasement. The surfaces of the protrusions opposite to the surfaces on which the pressure force is applied are in gaseous communication with the atmosphere via an exhaust port. The resultant pressure differential causes the rotors to rotate in the direction of low pressure.

The hot gasses change direction smoothly and infrequently in the power section of the present invention, as opposed to the significant number of vector changes found in a turbine power section. This ease of gas movement provides a reduced amount of drag and turbulence and helps the present invention to provide a dramatic increase in efficiency over present day turbo-shaft engines.

As previously mentioned, the turbo-shaft engine is available only at a very high cost, which limits its use to military and commercial aircraft, military conveyances such as tanks and ships, and large electrical power plants. In these high-end applications, the costs of acquisition and the expensive provision of regeneration is not so much at issue. In addition to the high cost of the exotic materials required, additional costs are incurred due to the turbo-shaft engine's high rotational speeds, which require special bearings and lubrication systems, with no tolerance for error in manufacturing.

In contrast, the power section of the present invention has relatively low rotational speeds, reducing the requirement for special bearings and lubrication systems, thus reducing the cost of manufacture. Additionally, the low rotational inertia present at the lower speeds of rotation allows speed changes to be effected much more easily and quickly when compared to the turbo-shaft engine.

The present invention is simple in structure, with few moving parts, making it significantly less expensive to manufacture than today's reciprocating engines as well. This low cost of manufacture along with an unprecedented efficiency, allows an opportunity for wide-spread use in hybrid automobiles, boats, trains, airplanes, electrical generators, and other usages in which a simple, low cost, highly efficient, clean burning, multi-fuel engine can be of service.

DESCRIPTION OF THE RELATED ART

Robin et al, U.S. Pat. No. 2,852,914, Sep. 23, 1958 discloses art related to a Brayton cycle internal combustion engine of the open, or constant pressure type in a turbojet power plant with a turbine power section. Robin teaches an innovative method of supporting the combustion chamber. Robin however does not teach or anticipate the use of anything other than a turbine power section in a turbojet power plant.

Kuroda et al, U.S. Pat. No. 5,069,029, Dec. 3, 1991 discloses a combustion chamber for a Brayton cycle internal combustion engine of the open, or constant pressure type that is a gas-turbine engine, in which multiple chamber areas are used to help reduce the oxides of nitrogen. Kuroda however does not teach or anticipate the use of anything other than a turbine power section in a turbojet power plant.

SUMMARY OF THE INVENTION

A primary object of the present invention is to provide a Brayton cycle internal combustion engine of the open, or constant pressure type, with an increased fuel efficiency over open cycle engines and reciprocating engines of the prior art, reducing emissions and lowering operating costs Another object of the present invention is to provide a Brayton cycle internal combustion engine of the open, or constant pressure type, that is less complex in fabrication than open cycle engines and reciprocating engines of the prior art, easing manufacture, and lowering acquisition costs.

An additional object of the present invention is to provide a Brayton cycle internal combustion engine of the open, or constant pressure type, in which heat transfer to the power section components is less than open cycle engines of the prior art, reducing the need for exotic, heat resistant metals, and their attendant manufacturing complexity and cost.

Another object of the present invention is to provide a Brayton cycle internal combustion engine of the open, or constant pressure type, for general use that can run cleanly, efficiently and safely on a wide range of different fuels.

These, and other objectives are achieved in the present invention, which extracts power from the pressure of hot gasses of combustion. The relatively low speed of the hot gasses greatly reduces drag, a product of the square of the speed, which substantially increases efficiency. The slower gas speed, when compared to a turbo-shaft engine, also provides less heat transfer to the metal parts of the power section, which is represented by a lower film co-efficient in the heat transfer equation. This equation shows that lowering the speed of the hot gasses results in a substantial reduction of the amount of heat transferred into adjacent parts. Lowering the amount of heat transfer, reduces or eliminates the need for exotic heat-resistant metals and their attendant manufacturing costs.

Additional cooling of the components in the power section of the present invention, takes place due to the expansion and resultant cooling of the hot gasses during the part of the cycle that the gasses are released through the exhaust port into the atmosphere. The portions of the rotors and rotor protrusions that are in gaseous communication with these expanding gasses are provided cooling by the expanding gasses. In comparison, the turbine parts in a turbo-shaft engine are continuously exposed to high-speed hot gasses, and there is little cooling of the turbine components that can be attributed to expanding gasses.

DESCRIPTION OF THE PREFERRED EMBODIMENT

Figure 1:
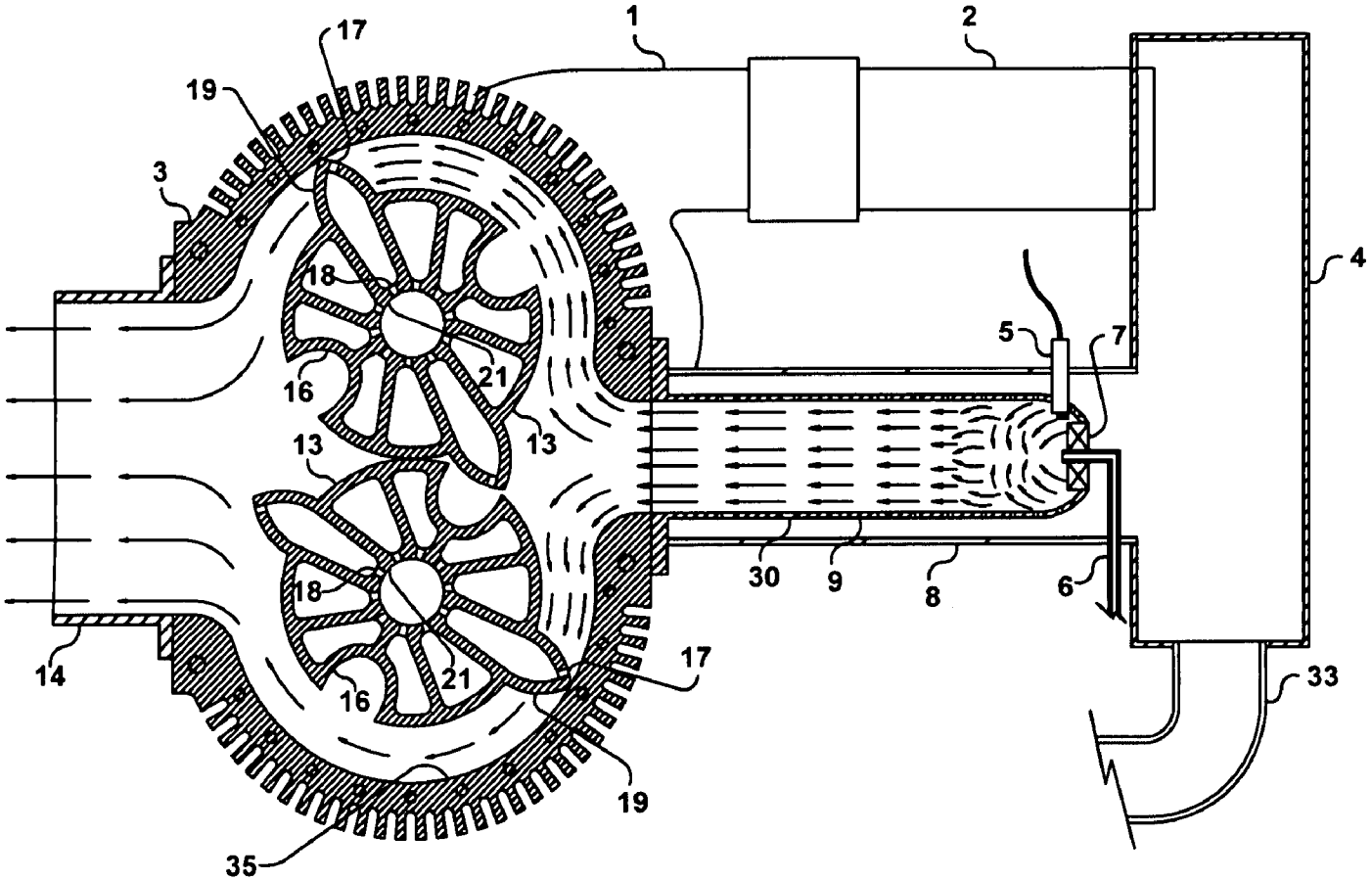
FIGS. 1 and 1A show cross-sections of an embodiment of a Brayton cycle internal combustion engine of the open, or constant pressure type relative to the present invention.
Figure 1A:
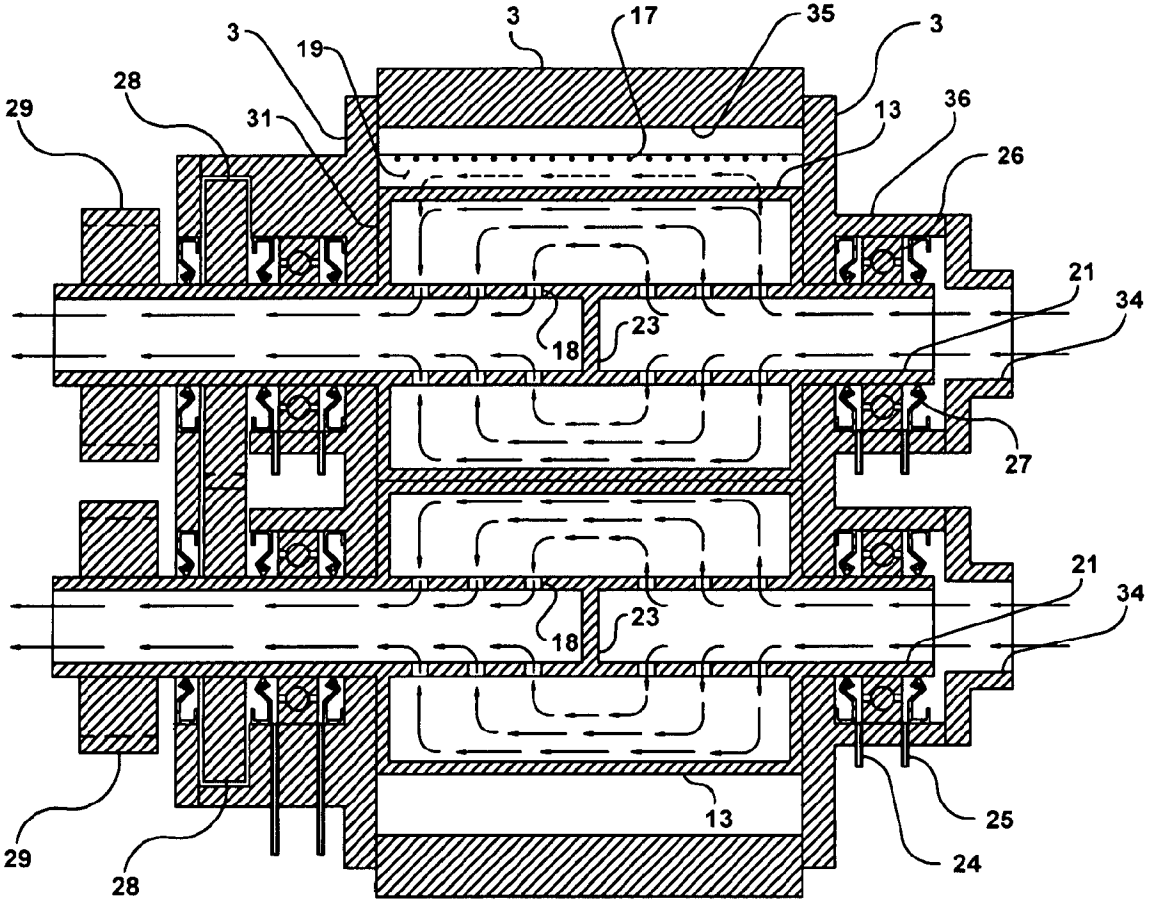

Referring to the drawings FIGS. 1 and 1A, the FIG. 1 section is taken on a line through the mid-point of the rotors 13, combustion chamber liner 9, and plenum 4. The rotor shaft plugs 23, shown in FIG. 1A, are not depicted in this view. The FIG. 1A section is taken on a line taken longitudinally through the centers of the hollow rotor shafts.

In operation;

A centrifugal compressor 1, driven by a drive gear 29 on one of the hollow rotor shafts 21, forces compressed air through a compressed air duct 2 and into a plenum 4. The plenum 4 transfers the compressed air to a combustion chamber shroud 8, which conducts the compressed air to a combustion chamber liner 9, via a swirler 7, and air metering holes 30. Fuel is introduced into the combustion chamber liner 9 by a fuel-metering nozzle 6, which is fed by a fuel-metering pump, which is of conventional design and not shown. The swirler 7 and the air metering holes 30 create turbulence to mix the compressed air homogeneously with the fuel, which may be a liquid, solid particulate, or gas.

The fuel-air mixture is ignited inside the combustion chamber liner 9 in an isobaric or constant pressure process, by an igniter 5 and is further mixed with the compressed air entering the combustion chamber liner 9 through air metering holes 30. The resulting hot gasses of combustion provides a constant pressure to the surfaces of rotor protrusions 19 which are integral with the rotors 13. The opposing surfaces of the rotor protrusions 19 are open to the lower atmospheric pressure via the exhaust port 14. This pressure differential at the rotor protrusions causes the rotors to turn counter-rotationally. The pressure of hot gasses inside the combustion chamber liner 9 is held slightly lower than the pressure of the compressed air outside said combustion chamber liner by modulation of the fuel, so that the hot gasses do not bleed back out of said combustion chamber liner through the metering holes 30.

The rotors 13, which are identical in this embodiment, turn counter-rotationally in a precise 1:1 ratio by the use of a pair of rotor gears 28 which are fixedly connected to hollow rotor shafts 21. The rotors turn in the directions shown by the arrows around the rotor peripheries in FIG. 1 that depict burning gasses. The pressurized hot gasses are substantially prevented from leaking between the rotor protrusions 19 and the rotor cavities 16, by the closeness of the surfaces of the rotor protrusions 19 to the surfaces of the rotor cavities 16. Rotor protrusion and rotor cavity shapes other than those shown may also be useful, for example, the rotor protrusions 19 may grow in radius to further fill the rotor cavities 16, and said rotor cavities may themselves grow in radius.

Pressurized hot gasses are substantially prevented from leaking between the rotor protrusions 19, and the internal rotor encasement contours 35 by the closeness between said parts. Pressurized hot gasses are also substantially prevented from leaking between the sides of the rotors 31 and the inner sides of the rotor encasement 3 by a closeness between said parts. The surfaces of the sides of the rotors 31 and the sides of the rotor encasement 3 are depicted as flat in this embodiment for ease of fabrication, however to provide a lighter weight, said rotors and rotor encasement sides could also be convex and concave respectively, or vice-versa, to provide a higher strength to resist the pressure of the hot gasses, while weighing less. Labyrinth or other types of seals may be used in any or all of the areas of close proximity to provide additional sealing of leakage of the combustion gasses.

The hollow rotor shafts 21 are supported by hollow rotor shaft bearings 26, which are ball bearings in this embodiment, however the bearings could also be of the plain or roller type. Oil for lubrication is pumped to the bearings through oil feed tubes 24 by an oil pump of conventional design that is not shown. The oil flows to, or is sprayed on the rotational parts of the bearing, and is contained within the bearing housing 36 by bearing seals 27. Pressure from the compressor bleed air may be applied to the cavity between the innermost of the bearing seals 27 and the rotor encasement 3, through seal cavity ports 24, to prevent hot gasses from leaking through to the seals. Excess oil is returned by way of the oil return tubes 25 to an oil cooler and sump of conventional design, which are not shown.

The rotors 13, hollow rotor shafts 21, rotor protrusions 19, and rotor cavities 16, are cooled by compressor bleed air that is introduced to the hollow rotor shafts 21 through the bleed air intake ports 34. Other pumping means and other fluids may be used for cooling as well, such as water cooling, The hollow rotor shafts 21 have hollow rotor shaft plugs 23 at their middle, to force air through a plurality of hollow rotor shaft ducting holes 18 on the air entrance side of the hollow rotor shaft plugs 23 for the purpose of cooling the internal walls of the rotors 13, rotor protrusions 19, and rotor cavities 16. The air absorbs heat from said rotors, rotor protrusions, and rotor cavities, and then exits through hollow rotor shaft ducting holes 18 on the exit side of the hollow rotor shaft plugs 23.

Compressor bleed air is piped to the bleed air intake ports 34 from the bleed air exit tubes 33 that are in gaseous communication with the plenum 4 by air duct piping that is not shown. The rotor protrusions 19 have rotor protrusion bleed holes 17 to help cool said rotor protrusions, and the rotor encasement contours 35. The cooling requirements may be reduced with the use of insulating ceramic or other high temperature coatings in the areas that are exposed to hot gasses.

Rotational power may be taken from the engine using one or both of the drive gears 29. Said rotational power may alternately be taken from one or both of the enmeshed rotor gears 28 as could power be taken to drive the compressor, in which case one or both of the drive gears 29 could be eliminated.

What is claimed is:

1. An internal combustion engine operating in an open Brayton cycle with a combustion cycle performing at constant pressure, said engine comprising:

an air compressor, wherein said air compressor including at least one of a centrifugal air compressor and an axial air compressor, a plenum of substantially tubular shape in gaseous communication with said air compressor, a combustion chamber shroud of substantially tubular shape in gaseous communication with said plenum a combustion chamber liner, perforated, and of substantially tubular shape fixedly attached within said combustion chamber shroud, a fuel metering means in gaseous communication with said combustion chamber liner, a mixing means to mix compressed air and fuel within said combustion chamber liner, an ignition means to ignite the mixture of compressed air and fuel in said combustion chamber liner, a power extraction means in gaseous communication with said combustion chamber liner, wherein, said power extraction means further comprises;

a rotor encasement, an intake port in gaseous communication with a cavity of said rotor encasement, an exhaust port in gaseous communication with a cavity of said rotor encasement,

[a first rotor, oblong in shape and closely confined within said rotor encasement, having at least two opposing protrusions and two opposing cavities longitudinally aligned on said first rotor, said cavities providing a clearance for said protrusions during the time of the cycle when said protrusions are in proximity to said cavities, a second rotor, oblong in shape and closely confined within said rotor encasement and in close rolling contact with said first rotor, having at least two opposing protrusions and two opposing cavities in longitudinal alignment, said cavities providing a clearance for said protrusions during the time of the cycle when said protrusions are in proximity to said cavities,]

*a first rotor and a second rotor in close rolling contact with each other, the first rotor and second rotor being oblong in shape and closely confined within said rotor encasement, and each having at least two opposing longitudinally aligned protrusions and two opposing longitudinally aligned cavities, said cavities on the first and second rotors providing a clearance for said protrusions on the second and first rotors respectively during the time of the cycle when said protrusions are in proximity to said cavities,* a first hollow shaft at the center of said first rotor, a second hollow shaft at the center of said second rotor, a first bearing means attached to said first hollow shaft of said first rotor, and second bearing means attached to said second hollow shaft of said second rotor, wherein said first and second bearing means provides a rotational coupling between said first hollow shaft of said first rotor and said rotor encasement, and between said second hollow shaft of said second rotor and said rotor encasement, sealing means to prevent lubricant used in said first and second bearing means from escaping from said first and second bearing means, a first gearing means fixedly attached to said first hollow shaft of said first rotor, and a second gearing means fixedly attached to said second hollow shaft of said second rotor, wherein, said first gearing means and said second gearing means are enmeshed to provide a counter-rotational movement to said first rotor and said second rotor.

*2. An internal combustion engine operating in an open Brayton cycle with a combustion cycle performing at constant pressure, said engine comprising:*

*an air compressor,*

*a plenum of substantially tubular shape in gaseous communication with said air compressor,*

*a combustion chamber shroud of substantially tubular shape in gaseous communication with said plenum*

*a combustion chamber liner, perforated, and of substantially tubular shape fixedly attached within said combustion chamber shroud,*

*a fuel metering device in gaseous communication with said combustion chamber liner,*

*a mixing device to mix compressed air and fuel within said combustion chamber liner,*

*an ignition means to ignite the mixture of compressed air and fuel in said combustion chamber liner,*

*a power extraction device in gaseous communication with said combustion chamber liner,*

*wherein, said power extraction device further comprises;*

*a rotor encasement,*

*an intake port in gaseous communication with a cavity of said rotor encasement,*

*an exhaust port in gaseous communication with a cavity of said rotor encasement,*

*a first rotor and a second rotor in close rolling contact with each other, the first rotor and second rotor being oblong in shape and closely confined within said rotor encasement, and each having at least two opposing longitudinally aligned protrusions and two opposing longitudinally aligned cavities, said cavities on the first and second rotors providing a clearance for said protrusions on the second and first rotors respectively during the time of the cycle when said protrusions are in proximity to said cavities,*

*a first hollow shaft at the center of said first rotor,*

*a second hollow shaft at the center of said second rotor,*

*a first bearing means attached to said first hollow shaft of said first rotor, and*

*second bearing means attached to said second hollow shaft of said second rotor,*

*wherein said first and second bearing means provides a rotational coupling between said first hollow shaft of said first rotor and said rotor encasement, and between said second hollow shaft of said second rotor and said rotor encasement,*

*sealing means to prevent lubricant used in said first and second bearing means from escaping from said first and second bearing means,*

*a first gearing device fixedly attached to said first hollow shaft of said first rotor, and*

*a second gearing device fixedly attached to said second hollow shaft of said second rotor,*

*wherein, said first gearing device and said second gearing device are enmeshed to provide a counter-rotational movement to said first rotor and said second rotor.*

* * * * *